United States Patent
Chen et al.

(10) Patent No.: US 6,945,711 B2
(45) Date of Patent: Sep. 20, 2005

(54) MULTIPLEXER WITH A DENSE WAVELENGTH DIVISION MULTIPLEXING FUNCTION

(75) Inventors: Guo-Zen Chen, Taipei (TW); Ray-Ming Lin, Shinjuang (TW); Tzer-En Nee, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 131 days.

(21) Appl. No.: 10/695,292

(22) Filed: Oct. 28, 2003

(65) Prior Publication Data

US 2005/0089268 A1 Apr. 28, 2005

(51) Int. Cl.[7] .............................. G02B 6/32; H04J 14/02
(52) U.S. Cl. .............................. 385/93; 398/86; 398/88
(58) Field of Search .................. 385/88–94; 398/82–88, 398/68–72

(56) References Cited

U.S. PATENT DOCUMENTS

| | | | |
|---|---|---|---|
| 6,198,864 B1 * | 3/2001 | Lemoff et al. ................. | 385/47 |
| 6,339,487 B1 | 1/2002 | Gnauck et al. | |
| 6,396,978 B1 * | 5/2002 | Grann ........................... | 385/24 |
| 6,636,540 B2 * | 10/2003 | Uebbing ....................... | 372/36 |
| 6,870,976 B2 * | 3/2005 | Chen et al. ................... | 385/14 |

* cited by examiner

*Primary Examiner*—Akm Enayet Ullah
*Assistant Examiner*—Jerry T Rahll
(74) *Attorney, Agent, or Firm*—Alan D. Kamrath; Nikolai & Mersereau, P.A.

(57) ABSTRACT

This invention relates to a multiplexer with a DWDM function, mainly comprising two modules, and an optic fiber is linked between said two modules, in which several filters and reflection mirrors, inclined slabs, laser diodes, receiver, and optical detectors detecting reflection light are provided in each module; thereby, many groups of optic signals may be mutually transmitted in a line of optic fiber at the same time so that the volume of mutually transmitted signals may multiplies under the condition of no extra paved optic fibers required, and in order to effectively detect the variations of laser for promotion of the stability of the module, the laser diode and the optic detector are further located in a predetermined site and the inclined slab is used to draw the reflection light of the laser to the nearby optic detector detecting the reflection light.

2 Claims, 3 Drawing Sheets

MULTIPLEXER WITH A DENSE WAVELENGTH DIVISION MULTIPLEXING FUNCTION

FIELD OF THE INVENTION

This invention relates to a multiplexer with a dense wavelength division multiplexing (DWDM) function and further to a multiplexer module with a DWDM function transmitting each other a multiple of signals using one line of optical fiber transmission medium required.

BACKGROUND OF THE INVENTION

In recent years, thanks to Internet, optical fiber communication has been widespread in the world. People require increasingly more information than the current transmission media may load, so optic fiber is the only one choice.

Dense Wavelength Division Multiplexing is very essential in the field of optic fiber communication, in order to transmit data each other; referring now to FIG. 3, a general idea of a bi-directional transmission of a combination of station A and station B is mentioned in U.S. patent application Ser. No. 6,339,487, in which station A has a station A receiver 360 and a station A transmitter 370 separately and a station A filter 304 is linked between the station A receiver 360 and the station A transmitter 370; further, station B has a station B receiver 360' and a station B transmitter 370' separately, in which a station B filter 304' is linked between the station B receiver 360' and the station B transmitter 370' and an optic fiber 350 is linked between said station B filter 304' and said station A filter 304; in order to transmit data, the transmitter 370 of said station A and the transmitter 370' of said station B may transmit optic transmission data of different wavelength, respectively, to the station A receiver 360 and the station B receiver 360' using a filter processing signal. Such a transmission idea is a quite good one.

In consideration of the idea, the inventor actively researches and designs it and finally develops the multiplexer with the DWDM function.

SUMMARY OF THE INVENTION

This invention mainly provide a multiplexer with a DWDM function using a line of optic fiber transmission media required to transmit each other a multiple of signals and further to effectively increase the throughput of the data mutually transmitted.

This invention is further to provide a multiplexer with a DWDM function that effectively monitors the variations of a laser so as to increase the stability of the module.

This invention is next to provide a miniaturized, variable, and more stable multiplexer with a DWDM function.

This invention is then to provide a multiplexer with a DWDM function that is made with injection molding at a low cost.

To reach the aim above mentioned, this invention provides the multiplexer with the DWDM function, mainly comprised of a first module and a second module, in which the optic fiber is linked between said first module and said second module, total reflection mirrors being respectively configured within the first module and the second module, a plurality of parallel filters being provided under each of the total reflection mirrors, each of the first lens separately corresponding to an adequate angle of inclination under each of the filters, each of the inclined slabs being separately spaced at intervals under each of the first lens, each of the laser diodes being separately provided under each of the inclined slabs, a receiver being provided between the two laser diodes, a optic detector being provided near each of the laser diodes; at a fit place of a reflection terminal provided at the total reflection mirror, each of the reflection interfaces being provided to receive the total reflection number, and at a side of the reflection interfaces, each of the second lens corresponding to said reflection interfaces being provided to focus a reflected light and then to transmit it to the optic fiber.

Advantageously, said first and second modules are injection moldings of organic whole.

Description will be as follows made accompanied with drawings according to preferred embodiments of this invention for a personage familiar with the art related to this invention to implement this invention upon this application.

DETAILED DESCRIPTION OF THE PREFERRED EMBODIMENT

Figure 1:
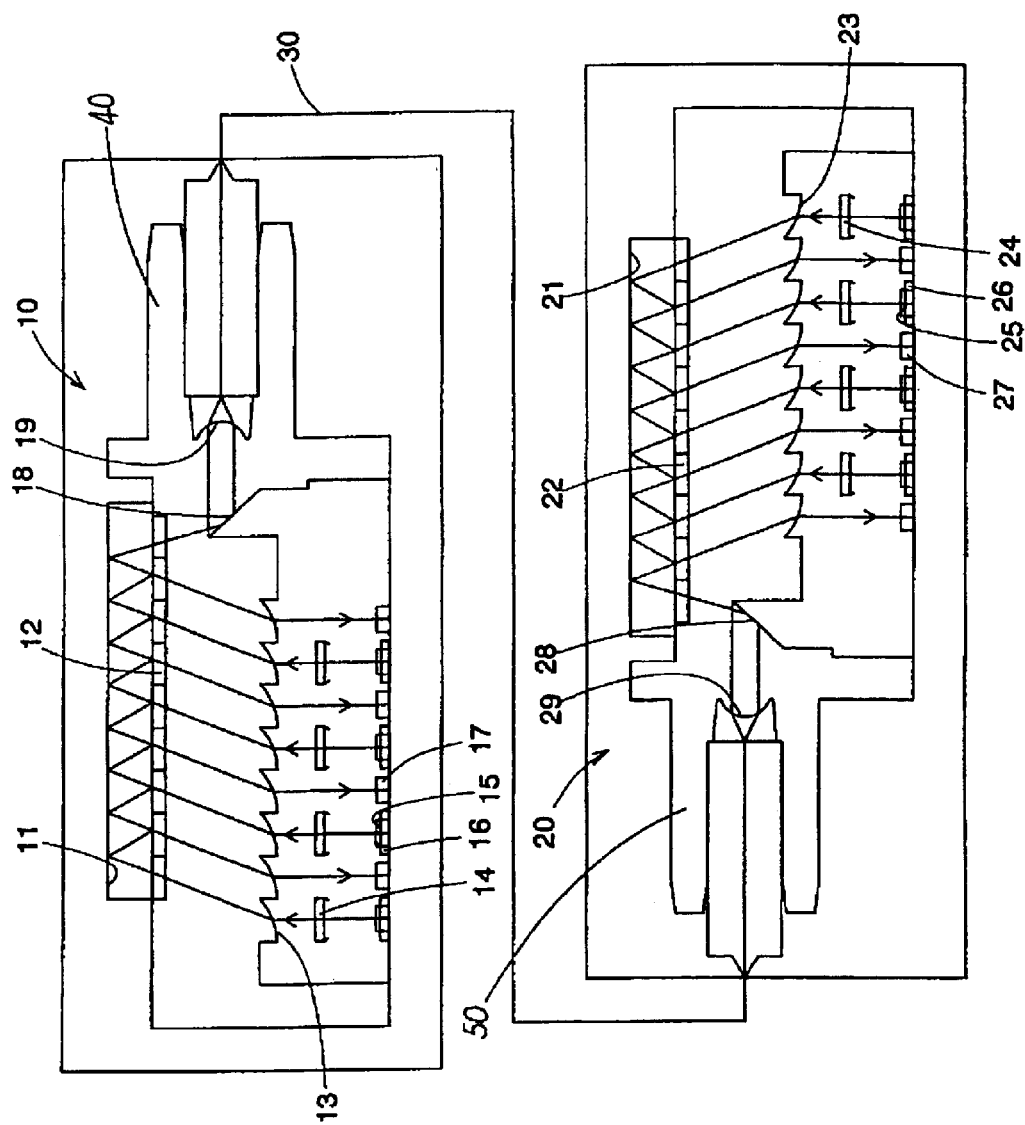
FIG. 1 shows a schematic drawing of a complete configuration according to this invention.

At first, referring now to FIG. 1, this invention has the multiplexer with the DWDM function, mainly being made up with a first module 10 and a second module 20.

The optic fiber 30 is linked between said first module 10 and said second module 20, and a first optic body 40, a second optic body 50, and the total reflection mirrors 11 and 21 are respectively configured within the first module 10 and the second module 20, a plurality of parallel filters 12 and 22 being provided under each of the total reflection mirrors 11 and 21, each of the filters 12 and 22 being able to filter all laser of different wavelength, each of the first lens 13 and 23 separately corresponding to the adequate angle of inclination under each of the filters 12 and 22, each of the inclined slabs 14 and 24 being separately spaced at intervals under each of the first lens 13 and 23, each of the laser diodes 15 and 25 being separately provided under each of the inclined slabs 14 and 24, each of the optic detectors 16 and 26 being provided near each of the two laser diodes 15 and 25, each of the optic detectors 16 and 26 being able to receive part of the reflection light from each of the laser diodes 15 and 25 so as to monitor the variations of the laser.

Between the two laser diodes 15 and 25, two receivers (Photodiode) 17 and 27 are separately provided to receive the data from the other side of modules, at the fit position of the reflection terminal provided at the total reflection mirrors 11 and 21, reflection interfaces 18 and 28 are separately provided to receive a signal from said total reflection mirrors 11 and 21, and at a side of the reflection interfaces 18 and 28 placed at said first and second modules 10 and 20, second lens 19 and 29 corresponding to said reflection interfaces 18 and 28 are provided, in which each of the second lens 19 and 29 may focus the reflection light and transmit it to the optic fiber 30, or gather the ray sent from the optic fiber into a parallel ray, and then send the signal to a proper receiver using an internal optical system for implementation of the transmission between the modules.

From the above-mentioned construction, the well-known idea of bi-directional transmission may be converted into a concrete structure through this invention, and the modules according to this invention may make the throughput of mutually transmitted data increased, being featured with miniaturization, variety, and stability.

Still referring now to FIG. 1 herein, description of the optic fiber transmission according to the designed structure will be made in the following.

According to this invention, the laser diode 15 in the first module 10 is driven through a voltage source to send out a light source, one part of the light source from the laser diode 15 reflecting, passing through the inclined slab 14 processed for coating, and the other part of light source penetrating, the penetrating light still forward moving and colliding against the first lens 13, the first lens 13 converting the laser dispersed by the laser diode 15 into the parallel ray, the parallel ray then penetrating through the filter 12 and still moving toward the total reflection mirror 11 and presenting the "Z" shape to progress at the time of reflection of the total reflection mirror 11, the parallel ray reflecting once in the total reflection mirror 11 on the filter 12; owing to the laser of different wavelength that is sent from the laser diode 15 and the filter 12 provided according to this invention being penetrated by a laser of only a specific wavelength, the laser of different wavelength may penetrate the filter 12 as that of said wavelength does; therefore, the parallel ray may be again directly reflected on the total reflection mirror 11 by way of a reflection of the filter 12 and then on the reflection interface 18, the laser reflected on the reflection interface 18, because of a theorem of the total reflection, being reflected on the second lens 19 so that the parallel ray working through a convergent effect of the second lens 19 focuses a beam of light in the optic fiber 30 and transmits the optic signal to the second module 20 through the transmission of optic fiber 30.

Further, an operation mode of the second module 20 is described below.

After entering the second mode 20 through the optic fiber 30 transmission, the optic signal will pass through the second lens 29 of the second module 20 and convert a divergent light from the optic fiber 30 into a parallel ray, the parallel ray proceeding to a forward move and then collide against the reflection interface 28, this ray being about to be reflected on the total reflection mirror 21, the ray reflected on the total reflection mirror, with the theorem of the total reflection, being about to be reflected on the filter 22; the light of a specific wavelength may pass through only a specific filter 22 so that the parallel ray passing through the filter 22 is directly focused on the receiver 26 again through the first lens 23, thereby finishing the flow of a single way of receiving and transmission.

Figure 2:
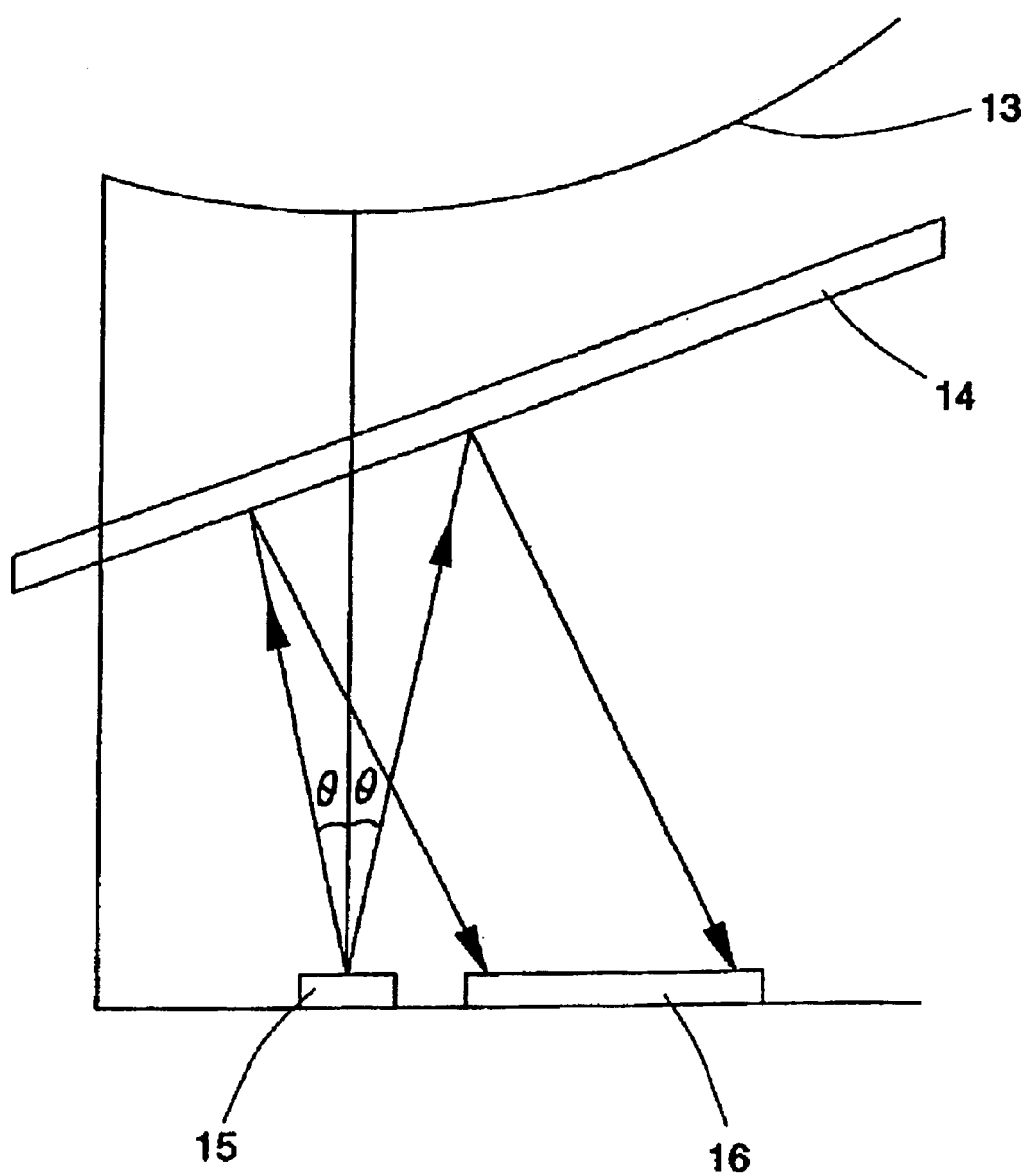
FIG. 2 shows a schematic drawing of a raying path of a reflection light according to this invention.
Figure 3:
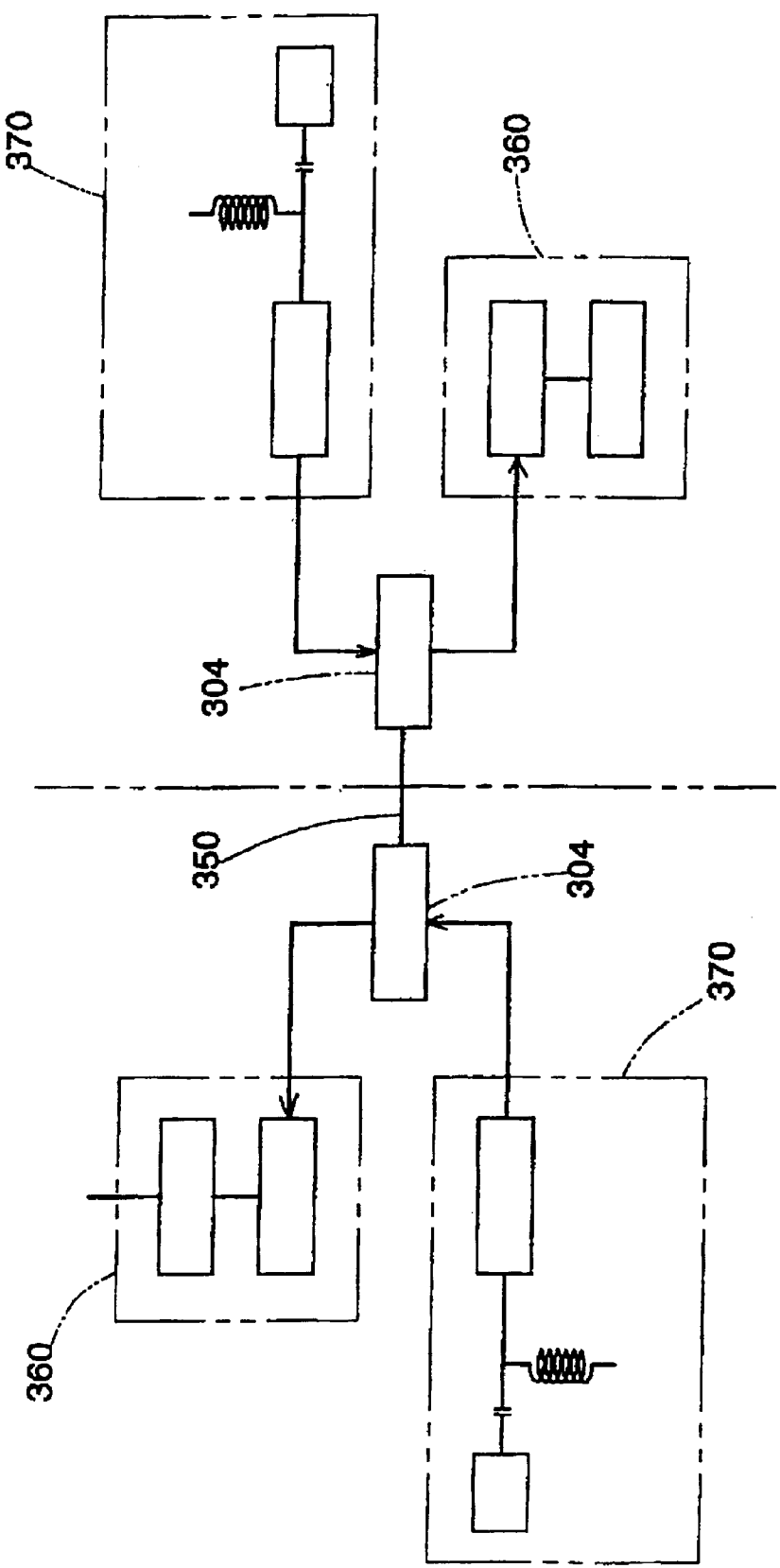
FIG. 3 shows a schematic drawing explaining an well-known idea of optic transmission.

Next, referring now to FIG. 2, several inclined slabs 14 and 24 are provided in the first and second modules 10 and 20 and a specified angle of inclination is present with the inclined slabs 14 and 24, so part of the laser transmitted from the laser diodes 15 and 25 is reflected on the optic detectors 16 and 26 near the laser diodes 15 and 25 and then received by the optic detectors 16 and 26 and then that the optic detectors 16 and 26 may detect each optical power density of the laser diodes 15 and 25; if the optical power density is small, the optic detectors 16 and 26 may offer a signal so as to allow an IC (not shown) to increase the drive current volume of said laser diodes 15 and 25, thereby restoring the optical power value of the laser diodes 15 and 25 to a normal one; consequently, according to this invention, a preferred compensation benefit of the optic power value (or the current volume) may be given to the laser diodes 15 and 25 through a configuration of the optic detectors 16 and 26 so that stability of the optic power is reached and the variations of laser may be effectively detected, thereby making the entire system still stabler.

Separately, this invention implements the multiplexer with the DWDM function that requires only two modules between which only a line of optic fiber is connected for achievement of the DWDM performance, so that the amount of optic fiber paved may be effectively decreased as a miniaturized entire optic fiber transmission system, that a signal may be mutually transmitted at the same time in a line of optic fiber, and that the throughput of data mutually transmitted may be increased, and then the current trend is towards the signal transmission featured with miniaturization, variety, and high stability so that the module is miniaturized to increase the density of the module in the system, thereby further increasing the throughput of data transmitted.

Indeed, this invention may at the same time send and receive a multiple of signals, a single mode fiber, a multi-mode fiber, and a plastic optical fiber may be used as the types of optical fiber for transmission, and the application network is mainly used for MAN and LAN.

To sum up, this invention implements the multiplexer with the DWDM function that uses only one line of optical fiber for achievement of the mutual transmission of a multiple of signals of wavelength, so that the amount of optical fiber paved may be effectively decreased and that signals may be mutually transmitted at the same time in a line of optical fiber, and that the throughput of data mutually transmitted may be increased for the features of miniaturization, variety, and high stability; also, the optical body is made with the art of injection molding and the cost is indeed decreased, so the requirements for application for this patent have been legally met.

What is claimed is:

1. A multiplexer with a DWDM function mainly being comprised of a first module and a second module, an optic fiber being linked between said first module and said second module, a total reflection mirror being configured within each of the first module and the second module, a plurality of parallel filters being provided under each total reflection mirror, a first lens separately corresponding to an adequate angle of inclination under each of the filters, an inclined slab being separately spaced at intervals under each of the first lenses, a laser diode being separately provided under each of the inclined slabs, a receiver being provided between two of the laser diodes, an optic detector being provided near each of the laser diodes;

at a fit place of a reflection terminal is provided a total reflection mirror, a plurality of reflection interfaces being provided to receive the total reflection number, and at a side of the reflection interfaces, a second lens corresponding to said reflection interfaces being provided to focus a reflected light and then to transmit it to the optic fiber.

2. The multiplexer with the DWDM function as claimed in claim 1, in which said first and second modules are injection moldings of organic whole.

* * * * *